Nov. 13, 1962  S. BREEN ETAL  3,064,173
SPEED SLAVING METHOD AND APPARATUS
Filed May 18, 1956  5 Sheets-Sheet 4

INVENTORS
STANLEY BREEN,
WALTER R. PECK,

BY Stone, Boyden & Mack,

ATTORNEYS

United States Patent Office 3,064,173
Patented Nov. 13, 1962

3,064,173
SPEED SLAVING METHOD AND APPARATUS
Stanley Breen and Walter Richard Peck, Asheville, N.C., assignors, by mesne assignments, to Celanese Corporation of America, New York, N.Y., a corporation of Delaware
Filed May 18, 1956, Ser. No. 585,791
14 Claims. (Cl. 318—312)

This invention relates to a method of and apparatus for driving one or more slave shafts in exact speed correspondence with a master frequency and, more particularly, to a system including at least a source of a master frequency and one slave shaft in which an exact correspondence and predetermined ratio of frequency of the master source and speed of the slave shaft can be obtained. The invention also relates to an apparatus for comparing two trains of voltage pulses to obtain an output indicative of their difference, which apparatus automatically insures that the output be accurate despite the sequence of arrival of the two trains of pulses at the apparatus. The invention further relates to an apparatus for generating a predetermined number of voltage pulses for each rotation of a shaft, with the number of pulses generated being selectable over a wide range.

There are many instances in industry where one shaft is rotated to perform a task and that rotation must be in exact correspondence with the rotation of another shaft which is performing a different task. One instance of such use is in the paper making and synthetic filament manufacturing industries where the uniformity of the end product of the process is dependent upon the speed of two shafts, one drawing the solution out of the supply tank, and the other drawing the product to the desired thickness. In these processes, any variation in the predetermined speed ratio between the two shafts is disadvantageous to the qualities of the end product.

Previously suggested speed controls of the electric type may be divided into two general categories. The first category includes a D.-C. tachometer generator driven by each of the two shafts, with the voltage outputs of the two generators compared and used to drive a servo system which drives the slaved shaft. The second type of control substitutes an alternator for the D.-C. generator and uses the variation in frequency of the changing speed of one shaft with respect to the other. With the first type of control, ratios of speeds other than 1:1 are achieved by a predetermined voltage division on one of the generators, and with the second type, by the use of mechanical speed reducers. The D.-C. tachometer generator method is capable of achieving accuracies of the order of ½%, while the alternator-variable frequency system is accurate to within 0.1%, with the errors of both systems being of both the short term and long term drift types.

While these systems of the prior art seem to be quite accurate, even the small errors which they produce are extremely disadvantageous in methods of the type above described. Moreover, the range of adjustment of these systems is limited. Further, a major disadvantage of prior velocity drives is their inherent inability to maintain exact accuracy for long periods of time, of the order of days, and to repeat exactly speed relationships previously established after a change has been made therein.

In contrast to these prior systems, the method and apparatus of this invention is capable of achieving any conceivable ratio of velocities between two shafts with no accumulative error in position and with a transient velocity error of the order of 0.01%, and further with an average velocity error of zero.

In order to obtain such accurate results, the method of the present invention includes generating a first constant predetermined number of pulses of voltage during each revolution of a slave shaft and generating a second constant predetermined number of pulses of voltage during a predetermined period of time, the ratio of the pulses being selectable, selecting a portion only of at least one of the trains of pulses to obtain two trains of pulses of the same frequency, comparing the first and second numbers of pulses to obtain a voltage output indicative of their difference, and controlling the velocity of the slave shaft in accordance with this voltage. In its preferred embodiment, where a master shaft controls a slave shaft, the apparatus includes a pair of magnetic, commutator, or photoelectric drums driven by the slave and master shafts, respectively, with each drum having a plurality of recordings of voltage pulses along its periphery, means for sensing the recordings mounted adjacent the drum, means for selecting the number of pulses from the sensing means, means for comparing the number of pulses from each of the slave and master drums to derive an analog voltage, and a servo amplifier for driving the slave motor provided with the analog voltage as an input.

The pulse train-comparing apparatus of the invention includes a pair of sequence circuits providing their outputs to a reversible counter, the sequence circuits each having two inputs, one being supplied by pulses from the associated drum and the other being supplied with a series of uniformly time-spaced pulses from a clock oscillator, with the sequence circuits and the clock oscillator cooperating to insure that pulses from the master and slave drums cannot arrive at the counter unit at the same time. The lengths and amplitudes of the master and slave pulses can vary from pulse to pulse without effect on the system.

The pulse generating apparatus of the invention includes a drum driven by a shaft, the drum having a plurality of discrete areas of a detectable characteristic spaced along its periphery, means for providing a plurality of separated trains of voltage outputs including means for detecting said characteristic of the discrete areas, and switches for selecting which of the trains of voltage pulses should progress to the output.

The invention also includes a particularly advantageous arrangement of recordings on a drum to insure that the best average distribution of pulses is obtained therefrom, no matter which of the pulse train circuits are complete.

The method and apparatus of the present invention will now be more fully described in conjunction with preferred embodiments thereof, illustrated in the accompanying drawings.

Figure 1:
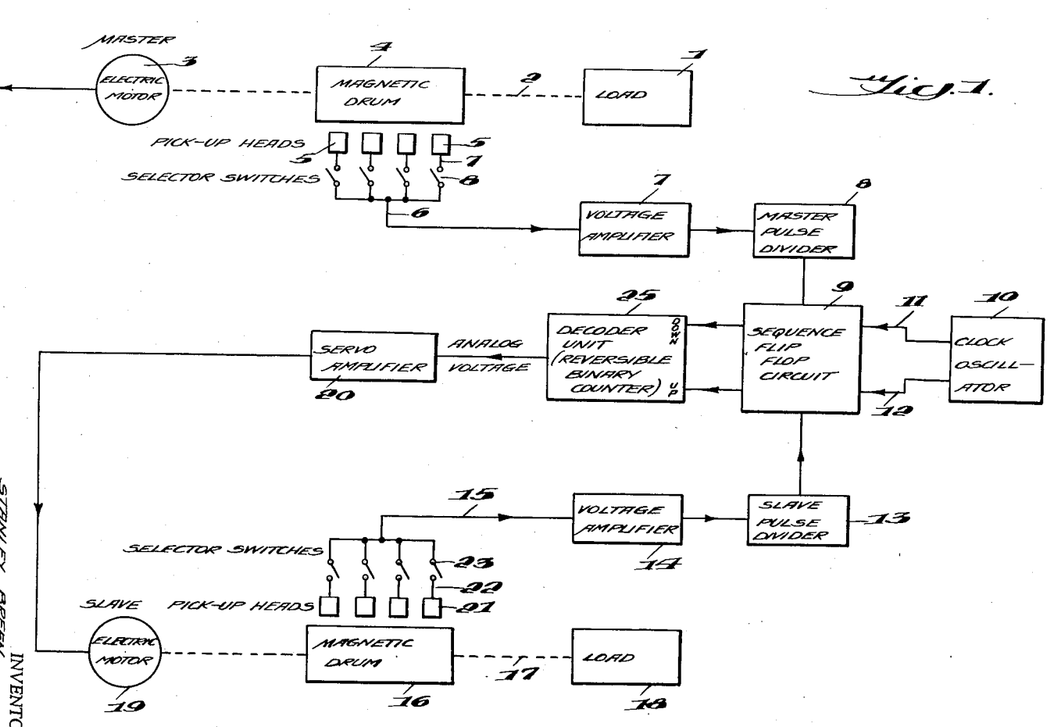
FIG. 1 is a block diagram of a preferred embodiment of the invention using a magnetic drum and a plurality of magnetic pick-up heads to generate the pulses from each of the master and slave shafts.
Figure 2:
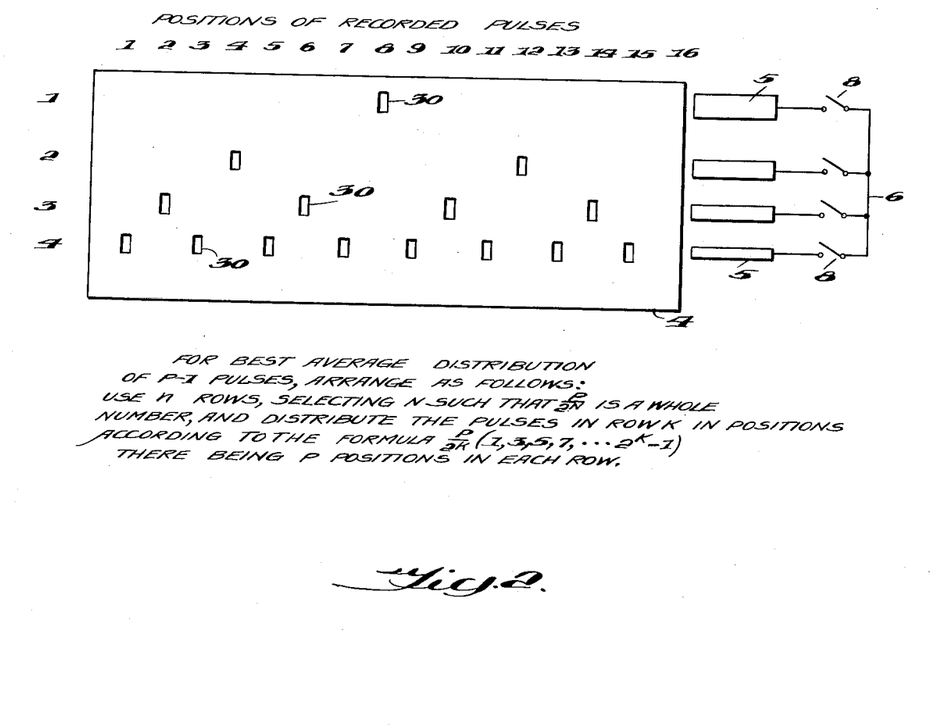
FIG. 2 is a schematic representation of the drum of FIG. 1, showing the arrangement of the recordings thereon.

Referring first to FIG. 1, a load 1, such as an apparatus for drawing a filament from a solution in a supply tank, is driven by a shaft diagrammatically indicated at 2. Shaft 2 is driven by a master electric motor 3 which is connected to an appropriate source of driving voltage (not shown). Shaft 2 also drives a drum 4 which carries a plurality of pulses of voltage recorded thereon, preferably magnetically. The pulses, as will later be described in conjunction with FIG. 2, are arranged on the drum in a plurality of axially-spaced tracks or rows, and the pulses are detected by a plurality of axially-spaced magnetic pick-up heads 5 which are mounted adjacent the periphery of the drum. All of the pick-up heads 5 provide their outputs to an output circuit or line 6, through a number of separate circuits 7, one for each of the pick-up heads. Each of the circuits 7 has a manually-operated switch connected therein to control whether the output of its pick-up head is supplied to output circuit 6.

Output circuit 6 is connected to the input of a voltage amplifier 7 of conventional type which supplies a train of pulses of voltage to a master pulse divider 8. Pulse divider 8 is of conventional type and may divide by any integer and be controllable to select the ratio between the number of pulses provided its output to the number of pulses supplied to its input. For instance, a binary or decimal counter may be used.

Figure 3:
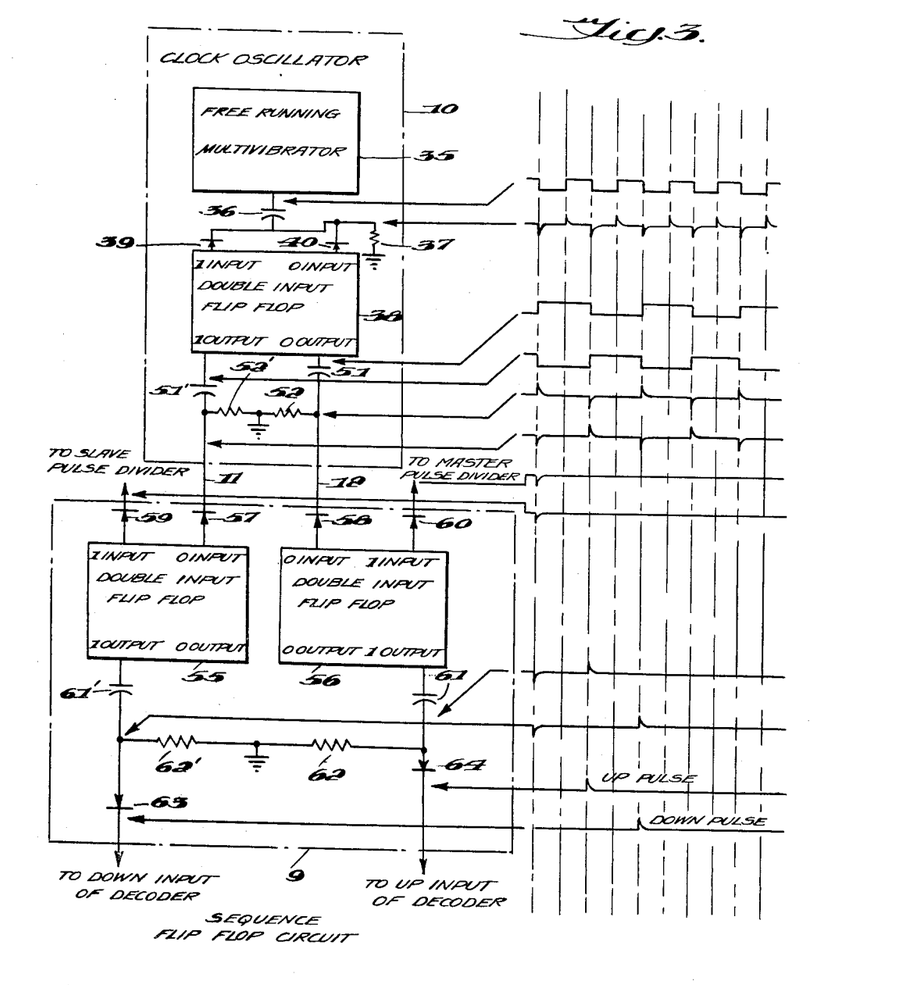
FIG. 3 is a schematic diagram of the pulse train comparing means of FIG. 1 including the clock oscillator and the sequence flip flop circuit.

The output of the master pulse divider 8 is provided to one input of a sequence flip flop circuit 9 which will be more fully described in conjunction with FIG. 3. The sequence circuit is also provided with a pair of trains of time-spaced voltage pulses from a clock oscillator 10 over lines 11 and 12. It is essential that the clock oscillator frequency be higher than any possible frequency of inputs to the sequence circuit from the master or slave shafts.

The sequence circuit 9 is also provided with a train of voltage pulses from the slave shaft through a slave pulse divider 13 of construction corresponding to that of the master pulse divider. The master and slave pulse dividers may be set so that different ratios between their output and input pulses are obtained with the two dividers. The slave pulse divider receives its input from a voltage amplifier 14 of construction corresponding to that of amplifier 7. The input to amplifier 14 is provided from an output circuit 15 of a pulse-generating apparatus including a magnetic drum 16 driven by slave shaft 17. The slave shaft also drives an appropriate load 18, which may be an apparatus for drawing a filament to its proper size, and the shaft is driven by an electric motor 19 whose speed is controlled by the magnitude of its input voltage from a servo amplifier 20.

Slave magnetic drum 16 is of construction corresponding to that of master magnetic drum 4, but it may have a different number of pulses recorded thereon. The recorded pulses from the slave drum are sensed by magnetic pick-up heads 21 which provide their outputs to circuits 22 having switches 23 therein to control the number of trains of pulses from the various pick-up heads which will reach the output circuit 15.

The sequence flip flop circuit 9 provides its two outputs to a decoder unit 25 which includes a reversible binary counter having a down and an up input. One of the outputs of the sequence circuit controls the down input of the counter, while the other output controls the up input of the counter. The decoder unit is of conventional type and provides an output analog voltage which is of magnitude indicative of the difference in number of the pulses provided to the input of the counter on the down input from the pulses provided on the up input. The analog voltage output of the decoder unit is supplied to the servo amplifier which, as indicated above, provides a voltage of magnitude determining the speed of the slave electric motor 19.

It will be noted that the apparatus of FIG. 1 provides a comparison between the instantaneous positions of the two shafts, and it does not directly measure the velocities of the shafts. The apparatus is therefore not susceptible to velocity error as the prior art velocity slaving systems are.

The distribution of the pulses of voltage on the master and slave magnetic drums may be as shown in FIG. 2, with the small rectangular discrete areas 30 representing the recorded pulses. The recordings 30 are distributed over the periphery of the drum along a plurality of axially-spaced tracks or rows, each row having a pick-up head 5 positioned opposite it to respond to passage of one of the recordings 30 by the pick-up head. In order to obtain the best average distribution of the pulses recorded on the drum, no matter which of the tracks or rows of the drum are to send pulse trains through to the output circuit 6, P–1 pulses are arranged on the drum in $n$ rows, with $n$ being selected such that $$\frac{P}{2^n}$$

is a whole number, and the recordings in each row $k$ being arranged in positions according to the formula $$\frac{P}{2^k}(1,3,5,7 \ldots 2^k-1)$$

there being P positions in each row. (By best distribution, we mean the best averaging of pulses per unit angle around the periphery of the drum.)

For the apparatus of FIG. 1 including four tracks or rows of recordings on the drum and four pick-up heads to respond to the various tracks, the 15 pulses are arranged: in the first row with a single pulse in the eighth position, in the seocnd row with pulses in the fourth and twelfth positions, in the third row with pulses in the second, sixth, tenth, and fourteenth positions, and in the fourth row with pulses in the odd positions from 1 to 15. With this arrangement of pulses, the best distribution thereof during each rotation of the drum 4 is obtained, no matter which of switches 8 are closed.

The apparatus of FIGS. 1 and 2 has been described as including a pulse generating means which comprises a magnetic drum having discrete recordings of voltage pulses thereon. It will be obvious, however, that it is not necessary that a magnetic drum be used, it only being necessary that recordings or discrete areas be arranged on a drum and have a characteristic differing from the characteristics of the surrounding area of the drum, the characteristic of the discrete areas being detectable, with the drum cooperating with an apparatus to detect passage of the discrete areas by it. For instance, a photo system including a source of light, a photo-electric cell, and a plurality of mirrors arranged around the periphery of the drum to fill the discrete areas, could function to provide the train of voltage pulses desired. These mirrors could also be arranged according to the formula indicated in conjunction with FIG. 2.

The magnetic drum of the described apparatus could also be replaced by a commutator having conductive elements arranged in the discrete areas referred to and whose presence in each row is detected by a brush connected in a circuit with a source of potential. The simplest form of such a commutator would have all the odd-numbered segments of the commutator connected to one switch-controlled circuit, every other even-numbered segment connected to a second switch-controlled circuit, every fourth even-numbered segment connected to a third switch-controlled circuit, etc., with the sides of the switches remote from the segments connected in parallel to the pulse divider.

It will also be appreciated that it is not even necessary that a drum be used, since the pulse generating device could consist of an oscillator whose frequency is controlled by the rotating shaft.

The apparatus for comparing the two trains of pulses obtained from the master and slave magnetic drums is more specifically shown in FIG. 3, together with wave forms of the voltage at various points in the apparatus.

This apparatus is designed to prevent a master and a slave pulse from being counted simultaneously, since, the master and slave pulses being capable of occurring in any random time distribution, they might arrive at substantially the same time. The clock oscillator 10 of FIG. 3 includes a free-running multivibrator 35 of conventional design which yields at its output a square wave voltage of constant frequency. The output of the multivibrator is differentiated through a circuit including a series capacitor 36 and a shunt resistor 37, thus yielding a pulse output with peaks of alternating positive and negative voltage. This differentiated train of pulses is provided to the inputs of a double input flip flop 38 through a pair of rectifiers 39 and 40 connected to the 1 and 0 inputs of the flip flop. The rectifiers are poled in such fashion that only the negative pulses have any effects on the flip flop 38.

Figures 4, 5:
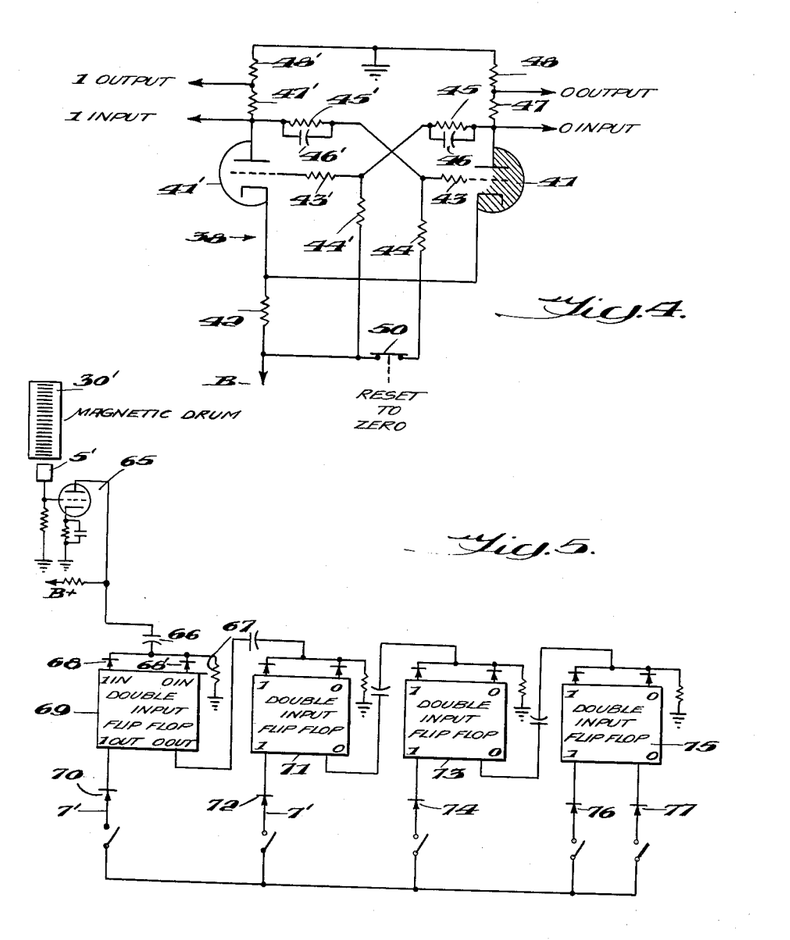
FIG. 4 is a schematic diagram of a double input flip flop of the type used in the apparatus of the invention.
FIG. 5 is a schematic view of another type of apparatus which can be used to generate the pulses for the shaft rotation.

The double input flip flop 38 may be of any appropriate type, but an example of its construction is shown in FIG. 4. In that figure, the flip flop includes a double triode tube shown in such state that its section 41 is conducting and its section 41' is not conducting. The cathodes of the two triodes are connected together and their common lead is connected through a resistor 42 to a source of high negative voltage, B— (not shown). The grids of the two triode sections are each connected through a pair of resistors 43 and 44, and 43' and 44', respectively, to B—, and the plates of the two triodes are connected to each other's grid circuit through the shunt combination of a resistor and a capacitor 45 and 46, and 45' and 45', respectively, the plate circuit being connected to the junction between the two resistors of the grid to cathode circuit.

Each of the plate circuits of the two triodes includes a pair of series-connected resistances 47 and 48, and 47' and 48', the ultimate connection being to ground. The inputs of the flip flop are provided to the plates of the two triodes, the 0 input going to the plate of the conducting section 41 and the 1 input going to the plate of the non-conducting section 41'. The 0 and 1 outputs are taken between the respective resistors 47 and 48 and 47' and 48' and ground. The apparatus also includes a normally-closed switch 50 in the grid circuit of the section 41 which is operative to reset the flip flop to the 0 condition shown, when the switch is opened.

The double input flip flop of FIG. 4 operates in conventional fashion which need not be fully described at this point. When the flip flop of FIG. 4 is used in the circuit 38 of FIG. 3, with the flip flop in the 0 condition shown in FIG. 4, a negative pulse on the 1 input turns off the 0 triode and throws the 1 triode into conduction, which conduction continues until a negative pulse is received upon the 0 input, when the conduction conditions reverse. The wave forms of the 0 and 1 outputs of flip flop circuit 38 are then as shown in FIG. 3.

The two outputs of the flip flop circuit 38 are then differentiated through a network including series capacitors 51 and 51' and shunt resistors 52 and 52', respectively, connected to ground. The differentiated outputs of the flip flop circuit 38 then consist of a pair of trains of voltage pulses which are alternately positive and negative, with the positive pulses of one train coinciding with the negative pulses of the other train. One train is provided to line 11, while a second train is provided to line 12, these lines being connected to the sequence flip flop circuit 9.

The sequence flip flop circuit 9 includes a pair of double input flip flop circuits 55 and 56, each of which may consist of a conventional double input flip flop such as shown in FIG. 4. The input line 11 is connected through a rectifier 57 to the 0 input of flip flop 55, while line 12 is connected through a correspondingly-poled rectifier 58 to the 0 input of flip flop 56. The 1 input of flip flop 55 is provided with pulses from slave pulse divider 8 through a rectifier 59, while the 1 input of flip flop 56 is provided with a train of pulses from master pulse divider 13 through a rectifier 60. All of rectifiers 57—60 are poled in such fashion that only the negative pulses get through the rectifiers to the inputs of the flip flops.

The wave forms for the master and slave pulse dividers are shown in such fashion that a pulse from the master and a pulse from the slave occurs at the same time and coincides with the negative pulse on line 11 and the positive pulse on line 12, the worst possible conditions for satisfactory operation of the circuits. With such conditions, the negative pulse through rectifier 60 in the 1 input of flip flop 56 will change the flip flop from the 0 to the 1 condition, or from the normal to the excited condition, while the negative pulse from the slave pulse divider through rectifier 59 will correspondingly change flip flop 55 from the 0 or the normal position to the 1 or the excited condition. Flip flops 55 and 56 will not be returned to their 0 or normal conditions until a negative pulse is again received on the 0 input. Since the negative pulses on the 0 inputs of the two flip flops are out of phase by a constant amount, equal to the pulse width of the clock oscillator or multivibrator 35, the flip flops return to their normal or 0 conditions at different times, as shown in the wave forms.

Only the 1 outputs of the flip flops 55 and 56 are used in this circuit, and each is connected through a differentiating circuit including a series capacitor 61 and 61', respectively, and shunt resistor 62 and 62' to ground. The 1 output of flip flop 55 is connected to the down input of the counter unit of decoder unit 25 through a rectifier 63, while the 1 output of flip flop 56 is connected to the up input of the counter unit of the decoder through a rectifier 64. Rectifiers 63 and 64 are poled in such fashion that only the positive pulses represented by the return of the flip flops from their excited to their normal conditions are provided to the decoder unit. Since these positive pulses are caused by pulses coming from lines 11 and 12 which are always out of phase with each other, the up and down pulses to the counter unit cannot occur at the same time.

In operation of the apparatus above described, consider a situation in which a slave shaft must be driven at exact speed correspondence with a master shaft, with the ratio of velocities of the two shafts being 1270:381, with the slave shaft running at the higher speed. This means that the master shaft must rotate exactly 381 revolutions while the salve shaft rotates exactly 1270 revolutions, but the number of pulses delivered from each shaft must be the same. An advantageous arrangement of recordings or pulses on the magnetic drums would include 255 pulses in seven rows. In accordance with the formula explained in conjunction with FIG. 2, the first row of each drum would have 128 pulses in positions according to the formula, and the remaining rows would have 64, 32, 16, 8, 4, 2 and 1 pulses, respectively. Then, any number of pulses between 1 and 255 may be selected by the selector switches. To obtain the above speed ratio, the master selector switches 5 corresponding to the rows containing 128, 64, 32, 16, 8, 4 and 2 pulses would be closed, while the slave selector switches corresponding to the rows containing 64, 32, 16, 8, 4, 2 and 1 pulses would be closed. Each revolution of the master shaft would then provide 254 spaced pulses, while each revolution of the slave shaft would provide 127 spaced pulses. Master divider 8 could then be set to divide the master pulse train by 3, while slave divider 13 could be set to divide the slave pulse train by 5. With this arrangement, for every 15 revolutions of the master shaft, the decoder 25 would receive 1270 pulses from the master shaft. In order for the decoder to receive the same number of pulses from the slave shaft, the slave shaft would have to run at a speed of $$\frac{1270}{381}$$

times as fast as the master shaft. The total number of revolutions turned by the slave shaft in 15 revolutions of the master shaft would then be $$\frac{15 \times 1270}{381}, \text{ or } 50$$

In 50 revolutions, the slave shaft must send the same number of pulses to the decoder as the master shaft does in 15 revolutions, that is, $$\frac{50 \times 127}{5}, \text{ or } 1270$$

The slave shaft would then run at $$\frac{1270}{381}$$

in speed with respect to the master shaft.

The apparatus of FIGS. 1 and 2 has been described in conjunction with a drum having a plurality of rows or tracks of recordings or discrete areas of detectable characteristics thereon. It is not necessary that a plurality of rows and a plurality of pick-ups be used, for the same result could be obtained with a single row and a plurality of frequency dividers supplying the circuits 7 and 22 of the outputs of the pick-ups. An apparatus to provide such an arrangement is shown in FIG. 5, where drum 4' carries a plurality of recordings 30' spaced in uniform fashion around its periphery in only a single row. A single pick-up 5' is used and supplies its output to an amplifier 65 which provides its output through a capacitor 66 across a resistor 67 connected to ground. The differentiated output of the pulse train obtained from the pick-up head is then supplied to a chain of double input flip flops, the voltage across resistor 67 being connected through rectifiers 68 and 68' to the 1 and the 0 inputs of flip flop 69. The flip flop 69, as well as the other flip flops of the chain, may be of the type shown in FIG. 4. Rectifiers 68 and 68' are poled so that only the negative pulses from the magnetic drum 4' are effective in the flip flop 69. The 1 output of flip flop 69 is connected to a series circuit 7' through a rectifier 70, while the 0 output of the flip flop is connected through a differentiating network to the second flip flop 71 of the chain. Again, the 1 output of the flip flop 71 is connected through a rectifier 72 to a second circuit 7', while the 0 output is connected through a differentiating network to the third flip flop 73 of the chain. The 1 output of flip flop 73 is connected through rectifier 74 to the third circuit 7', while the 0 output is connected to the last flip flop 75. The two outputs of flip flop 75 may be connected through rectifiers 76 and 77 to the remaining two circuits 7'.

With this arrangement, assuming that 16 equally spaced pulses are arranged on the magnetic drum, the first circuit 7' would receive the odd pulses from 1 to 15, while the second circuit would receive even pulses in the second, sixth, tenth and fourteenth positions, the third circuit would receive pulses from the fourth and twelfth positions, the fourth circuit would receive a pulse from the eighth position, and the fifth circuit would receive a pulse from the sixteenth position. It will be evident that the circuit of FIG. 5 therefore fulfills the same requirements as the magnetic drum arrangement of FIGS. 1 and 2.

It will be evident that we have described systems in which a master shaft and one slave shaft are driven in exact speed correspondence. More than one slave shaft could be driven from the same master shaft, and with different ratios of speeds, if desired, by an obvious extension of the apparatus shown for one slave shaft. Further, it is not necessary that a master shaft be the controlling element, since any device for generating a master frequency could be used. The apparatus of FIG. 6 shows a master oscillator of adjustable frequency 80 which is used to control two slave shafts, though one shaft or more than two shafts could be controlled.

Figure 6:
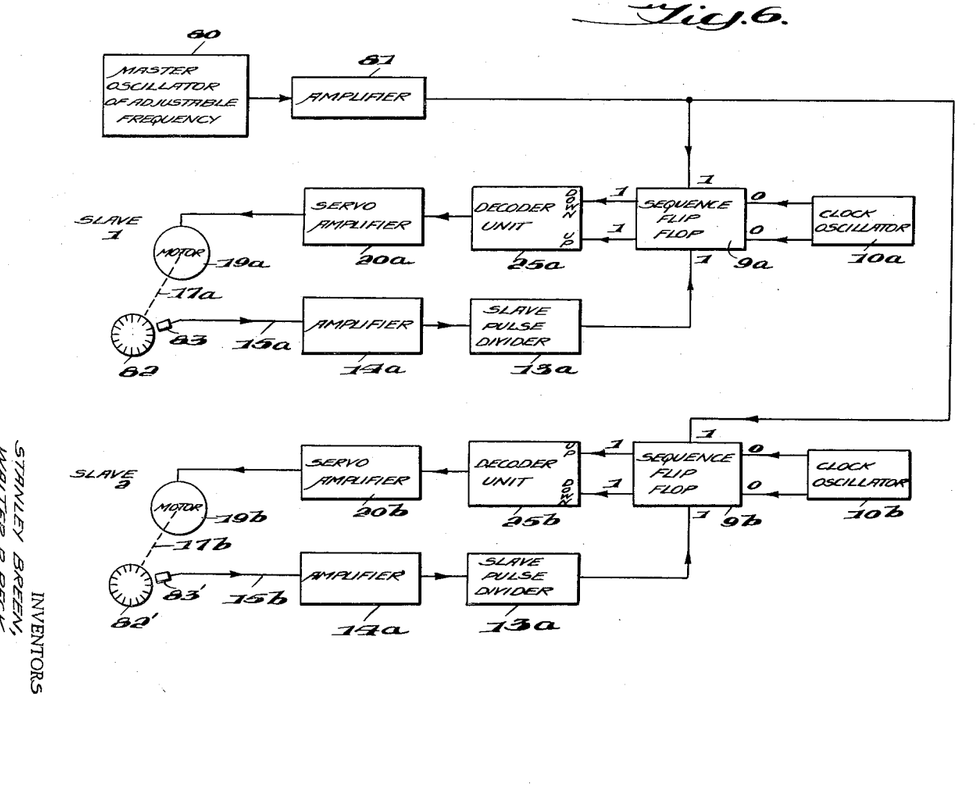
FIG. 6 is a block diagram of another embodiment of the invention in which a master oscillator controls each of two slave shafts.

Most of the apparatus of FIG. 6 is identical to corresponding apparatus of the earlier figures and will be identified with the same numerals provided with appropriate subscripts.

The master frequency voltage from oscillator 80 is amplified in a conventional amplifier 81 and supplied to one 1 input of each of the sequence flip flops 9a and 9b.

Preferably the master oscillations reaching the sequence flip flops are of pulse form, rather than a sine wave, and, if the master oscillator supplies a sine wave, amplifier 81 may contain an appropriate shaping circuit to provide a pulse output. The two 0 inputs of sequence flip flop 9a are supplied with timing pulses from clock oscillator 10a, while clock oscillator 10b supplies corresponding pulses to the 0 inputs of sequence flip flop 9b. The other 1 inputs of sequence flip flops 9a and 9b are supplied from slave pulse dividers 13a and 13b, respectively.

The 1 outputs of sequence flip flops 9a and 9b are supplied to the up and down inputs of decoder units 25a and 25b, respectively. The analog voltage outputs of the decoder units are supplied to amplifiers 20a and 20b which provide voltages to control electric motors 19a and 19b, respectively. The motors drive shafts 17a and 17b which may drive appropriate loads and also drive pulse generating apparatus which supply output circuits 15a and 15b. These circuits in turn drive amplifiers 14a and 14b which supply slave pulse dividers 13a and 13b.

The pulse generating apparatus for each of the slave shafts is shown diagrammatically in FIG. 6 as including magnetic discs 82 and 82' and pickup heads 83 and 83', though they preferably include the magnetic drum arrangement of either FIG. 2 or FIG. 5.

The apparatus of FIG. 6 operates in identical manner to that of FIG. 1, with the slave shafts 17a and 17b being driven in exact speed correspondence with the master frequency supplied by master oscillator 80, the ratio of speeds being capable of being set to any desired value, and the ratio being adjustable.

It will be evident that apparatus has been described that will function to drive a slave shaft in predetermined speed correspondence with a master shaft or a master frequency, the ratio of speeds of the master and slave shaft being readily selectable and accurately controlled. We have also described an apparatus for comparing two trains of voltage pulses to obtain a voltage output indicative of their difference, the apparatus being so constructed that no difficulty can be caused by possible coincidence of pulses in the two trains. We have further described an apparatus for generating a predetermined and selectable number of pulses for each rotation of a shaft. In conjunction with all of these apparatus, we have described preferred embodiments thereof. It will be evident that many minor changes could be made in the design of these preferred embodiments, without departing from the scope of the present invention. For instance, the pulse dividers could be eliminated if a sufficiently large number of combinations of pulses could be selected from the master and slave sources of pulses. The invention is therefore not to be considered limited to the embodiments described, but only by the scope of the appended claims.

We claim:

1. The method of driving a slave shaft in exact speed correspondence with a master frequency and with a predetermined ratio of speeds of master frequency and slave shaft other than 1:1 which includes the steps of generating a constant first predetermined number of pulses of electric voltage during a predetermined period of time, generating a constant second predetermined number of pulses of electric voltage during each revolution of the slave shaft, said two-mentioned predetermined numbers of pulses having a ratio determined by the predetermined ratio of speeds, selecting a portion only of at least one of the first and second numbers of pulses to obtain two trains of pulses bearing fixed ratios respectively to said first and second numbers of pulses and of the same frequency when the slave shaft is rotating at exactly said predetermined speed ratio to the master frequency, comparing the numbers of pulses in said two trains to obtain a voltage proportional to the difference of the pulses, and changing the speed of said slave shaft in accordance with said last-mentioned voltage.

2. The method of driving a slave shaft of a slave motor whose speed is determined by the magnitude of a voltage controlling it in exact speed correspondence with a master shaft and with a predetermined ratio of speeds of master and slave shafts other than 1:1 which includes the steps of generating a constant first predetermined number of pulses of electric voltage during each revolution of the master shaft, generating a constant second predetermined number of pulses of electric voltage during each revolution of the slave shaft, said two-mentioned predetermined numbers of pulses having a ratio determined by the predetermined ratio of speeds, selecting a portion only of at least one of the said first and second numbers of pulses to obtain two trains of pulses bearing fixed ratios respectively to said first and second numbers of pulses and of the same frequency when the slave shaft is rotating at exactly said predetermined speed ratio to the master shaft; comparing the numbers of pulses in said two trains to obtain a difference number of pulses, generating an analog voltage of amplitude corresponding to said difference number of pulses, and changing the speed of said slave motor in accordance with said analog voltage.

3. A speed slaving system for driving a slave shaft in exact speed correspondence with a master shaft and with a predetermined ratio of speeds of master and slave shafts other than 1:1, comprising means for generating a first predetermined and constant number of pulses of electric voltage for each revolution of the master shaft, means for generating a second predetermined and constant number of pulses of electric voltage for each revolution of the slave shaft, means for selecting a portion only of at least one of the first and second numbers of pulses to obtain two trains of pulses bearing fixed ratios respectively to said first and second numbers of pulses and of the same frequency when the slave shaft is rotated at exactly said predetermined speed ratio to the master shaft means including a reversible binary counter for receiving the pulses from the master and slave shafts and comparing them to produce a voltage signal having a magnitude and polarity determined by their difference, said last-named means including means for insuring that a pulse from the master shaft and a pulse from the slave shaft do not reach the counter at the same instant, and means responsive to said voltage signal for controlling the speed of said slave shaft.

4. Apparatus as defined in claim 3 in which each of said generating means includes a drum driven respectively by the master and slave shafts, each drum having a plurality of discrete voltage pulses magnetically recorded around its periphery, a magnetic reproducing head positioned adjacent the periphery of the drum operable to sense the passage of a recorded pulse opposite it and to translate the same into a voltage pulse, and separate means for each generating means fed from the output of the respective reproducing head for selecting the number of pulses to be fed to said means for receiving the pulses in accordance with the predetermined ratio of speeds of master and slave shafts.

5. An apparatus for producing a selectable number of voltage pulses during each rotation of a shaft comprising a drum driven by the shaft having a plurality of discrete areas around its periphery which differ in a detectable characteristic from the remaining area of the drum, means for providing a series of separate trains of voltage pulses including means mounted adjacent the periphery of the drum for detecting said characteristic and for generating a pulse of voltage each time one of said discrete areas passes said detecting means during rotation of the drum, a plurality of circuits each having its input connected to receive one of said trains of pulses and said circuits having all of their outputs connected together, each of said circuits including a switch operable when closed to permit the pulse train fed to its input to reach its output.

6. The apparatus of claim 5 in which said discrete areas of said drum are divided into a plurality of axially-spaced arcuately-extending tracks, there being one of said detecting means positioned adjacent each track, each of said detecting means feeding one of said circuits.

7. The apparatus of claim 6 in which said discrete areas are arranged in said tracks according to the formula $$\frac{P}{2^k}(1, 3, 5, 7 \ldots 2^k-1)$$

where P–1 equals the total number of said discrete areas on the drum and K is the number of the row, for $n$ total rows with $n$ having a value such that $$\frac{P}{2^n}$$

is a whole number.

8. The apparatus of claim 5 in which said pulse train providing means includes a plurality of double input flip flops arranged in a chain, the first obtaining its input from the detecting means and each of the rest obtaining its input from one input of the previous flip flop in the chain, the other outputs of the flip flops being connected to said circuits.

9. An apparatus for producing a selectable number of voltage pulses during each rotation of a shaft comprising a magnet drum driven by the shaft having a plurality of discrete recordings of voltage pulses on its surface arranged arcuately around its periphery, means for providing a series of separated trains of voltage pulses including a magnetic pick-up head mounted adjacent the periphery of the drum and operative to produce a pulse of voltage each time one of said recordings passes the head, a plurality of circuits each having its input connected to receive one of said trains of pulses and said circuits all having their outputs connected together, each of said circuits including a switch operable when closed to permit the pulse train fed to its input to reach its output.

10. The apparatus of claim 9 in which said recordings on the drum are arranged in a plurality of axially-spaced arcuately-extending tracks, there being one of said pickup heads positioned adjacent each track, each of said heads feeding one of said circuits.

11. The apparatus of claim 10 in which said recordings are arranged in said tracks according to the formula $$\frac{P}{2^k}(1, 3, 5, 7 \ldots 2^k-1)$$

where P–1 equals the total number of said recordings on the drum and $k$ is the number of the row, for $n$ total rows with $n$ having a value such that $$\frac{P}{2^n}$$

is a whole number.

12. The apparatus of claim 9 in which said pulse train providing means includes a plurality of double input flip flops arranged in a chain, the first obtaining its input from one output of the previous flip flop in the chain, the other outputs of the flip flops being connected to said circuits.

13. Apparatus for comparing two trains of electric voltage pulses to provide a signal indicative of the difference in number of the pulses of the two trains comprising a decoder including a reversible binary counter having an up input and a down input, first, second and third flip flops each having a pair of inputs and a pair of outputs, a free running constant frequency multivibrator coupled to each input of said first flip flop, means coupling the first and second outputs of said first flip flop to said second and third flip flops and operative with said first flip flop to supply a first sequence and a second sequence of normalizing pulses respectively to one input of the second and third flip flops, the pulses of the first sequence occurring only alternately with the pulses of the second sequence, each of said second and third flip flops having an excited and a normal condition and being operative to send pulses to the up and down inputs, respectively, of the counter only when they are switched from their excited to their normal conditions, means connecting said two trains of voltage to the other inputs of said second and third flip flops, respectively, so that the pulses of the two trains are operative to switch the second and third flip flops to their excited conditions from their normal conditions, whereby pulses corresponding to one of said trains of pulses cannot reach the counter simultaneously with pulses corresponding to the other train of pulses.

14. The apparatus of claim 13 in which each of said flip flops includes a single pair of vacuum tubes connected in bistable multivibrator arrangement.

References Cited in the file of this patent
UNITED STATES PATENTS

| | | |
|---|---|---|
| 2,115,086 | Riggs | Apr. 26, 1938 |
| 2,532,803 | Faus | Dec. 5, 1950 |
| 2,537,427 | Seid et al. | Jan. 9, 1951 |
| 2,628,539 | Neergaard | Feb. 17, 1953 |
| 2,690,531 | Marggraf et al. | Sept. 28, 1954 |
| 2,797,378 | Johnson | June 25, 1957 |

OTHER REFERENCES

Electronic Instruments, by Greenwood, Holdam, MacRae, page 480, par. 14-4, pub. by McGraw-Hill, N.Y. 1948.